United States Patent [19]
Walker

[11] Patent Number: 4,752,019
[45] Date of Patent: Jun. 21, 1988

[54] COMBINED DISPENSING HEAD AND LEVEL GAUGE

[76] Inventor: William T. Walker, 28 Tamela Dr., Little Rock, Ark. 72207

[21] Appl. No.: 933,113

[22] Filed: Nov. 21, 1986

[51] Int. Cl.$^4$ .............................................. B67D 5/22
[52] U.S. Cl. ..................................... 222/51; 222/154; 116/228
[58] Field of Search ................. 73/305, 307, 317, 322, 73/322.5; 116/228; 222/23, 41, 51, 154, 567–568

[56] References Cited

U.S. PATENT DOCUMENTS

| | | | |
|---|---|---|---|
| 1,026,582 | 5/1912 | Hertenstein et al. | 222/51 |
| 2,431,192 | 11/1947 | Munson | 222/568 X |
| 2,889,708 | 6/1959 | Williams | 73/322 X |
| 2,943,765 | 7/1960 | Glasgow et al. | 222/110 |
| 3,256,907 | 6/1966 | Clark et al. | 222/51 X |
| 3,901,417 | 8/1975 | Schiemann | 222/479 |
| 4,674,654 | 6/1987 | Fujii et al. | 222/39 |

FOREIGN PATENT DOCUMENTS 1168626 6/1984 Canada ................................ 222/568

Primary Examiner—Michael S. Huppert
Attorney, Agent, or Firm—Leonard Bloom

[57] ABSTRACT

A combined dispensing head and gauge for indicating the quantity of material in a container is disclosed. The combined dispensing head and gauge is comprised of a one-piece dispensing head which includes a dispensing head conduit, fiducial marks adjacent to the dispensing head conduit for indicating the quantity of material present in the container, a sealing flange for sealing the dispensing head with respect to the container, and a chamber for receiving a movable indicator. The combined dispensing head and gauge is further comprised of a level responsive device such as a float responsive to the level of material in the container, and a movable indicator pointer received by the chamber adjacent to the fiducial marks for indicating the quantity of material present in the container. The indicator pointer is controlled by the float and is pivotally supported thereon. A material supply conduit is connected to the dispensing head conduit for conveying material in the container to the dispensing head conduit. The material supply conduit also supports the float by a pivotal connection with the float.

6 Claims, 4 Drawing Sheets

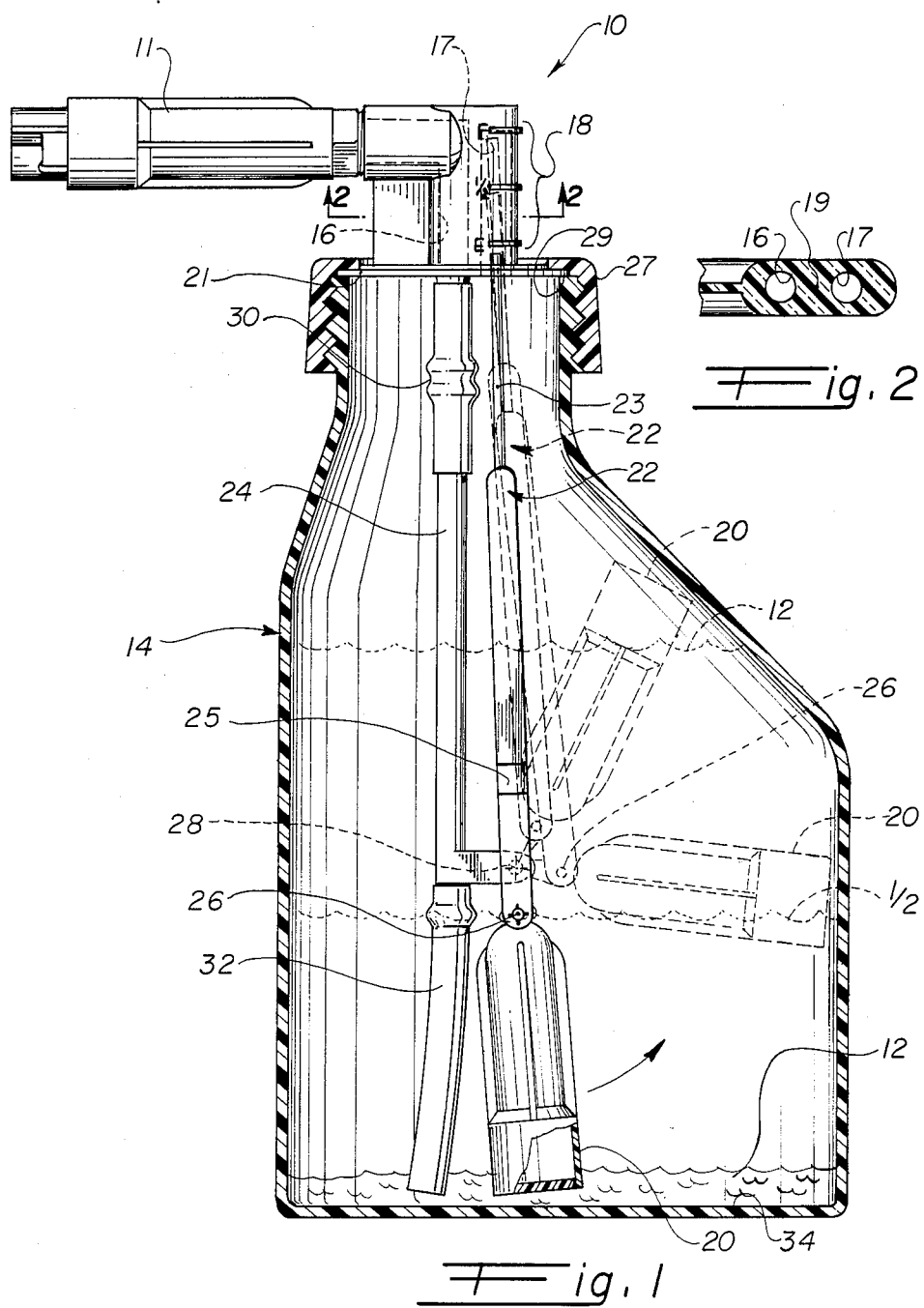

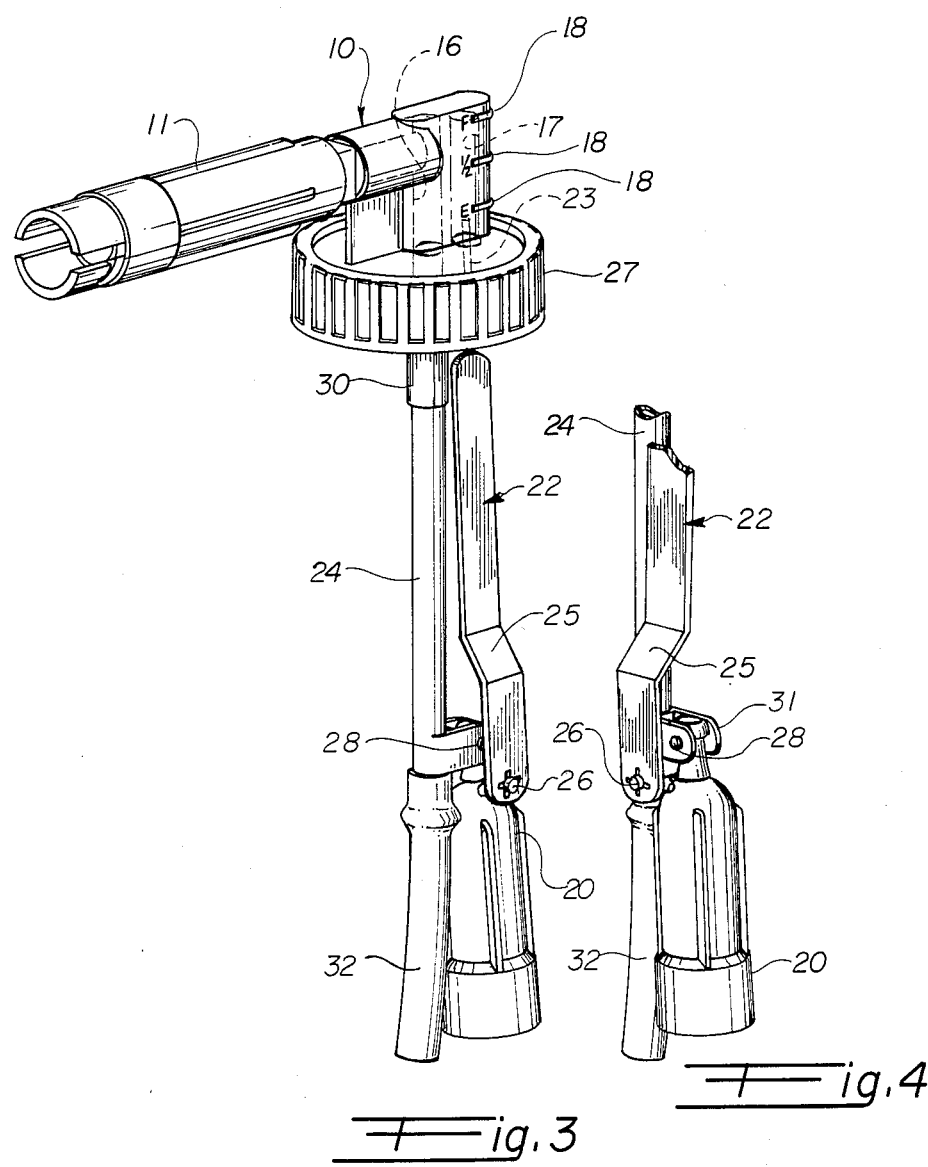

COMBINED DISPENSING HEAD AND LEVEL GAUGE

FIELD OF THE INVENTION

The present invention relates to devices for dispensing material from a container, and more particularly, to dispensers having means for conveniently and readily indicating the level of material in the container that has not been dispensed.

BACKGROUND OF THE INVENTION

In the art of dispensing materials (such as liquids or fine powders) from a container, there are many containers which are opaque and do not readily permit visual inspection to determine how much material is present in the container. It would be desirable before starting a dispensing operation to readily ascertain how much material is present in an opaque container. This would help prevent the undesirable situation of running out of material in the midst of the dispensing operation.

It is understood that the term "dispensing" as used herein, includes dispensing fluid streams and the spraying of material.

It would also be desirable to be able to ascertain how much material is present in the container even during the course of the dispensing operation.

In providing a dispensing apparatus which provides visual indication of the contents of an opaque container, it would further be desirable to provide a visual indicator which is convenient to observe, which is of simple construction, and which is made from inexpensive materials which are easily fabricated into the apparatus.

SUMMARY OF THE INVENTION

Accordngly, it is a primary object of the present invention to provide a apparatus which dispenses material from an opaque container and also provides a visual indication of the amount of material present in the container.

Another object of the invention is to provide a dispensing apparatus having a visual indication of the amount of the material present in the container which is easily observed by the operator of the apparatus.

Yet another object is to provide a visual indicator of the amount of the material in the container which is of simple construction.

Still another object of the invention is to provide a dispensing apparatus made from inexpensive materials which are easily fabricated into the apparatus.

To achieve the foregoing and other objects, and in accordance with the purposes of the present invention as described herein, an improved dispensing head is provided for dispensing material from a container and for indicating the level of material in the container that has not been dispensed. The dispensing head includes a dispensing head conduit and fiducial marks (or graduations) adjacent to the dispensing head conduit for indicating the quantity of material present in the container.

Preferably, the dispensing head of the invention is used in conjunction with a nozzle affixed to the dispensing head.

In a further aspect of the invention, and in accordance with its objects and purposes, a combined dispensing head and gauge for measuring and indicating the quantity of material in a container is provided. The combined dispensing head and gauge comprises a dispensing head conduit, fiducial marks adjacent to the dispensing head conduit for indicating the quantity of material present in the container, a level responsive device responsive to the level of material in the container, and a movable indicator adjacent to the fiducial marks for indicating the quantity of material present in the container. The movable indicator is controlled by the material level responsive device.

In a further aspect of the invention, and in accordance with its objects and purposes, a combined dispensing head and gauge for measuring and indicating the quantity of material in a container is provided in which the movable indicator is controlled by the level responsive device and is supported by the material supply conduit for conveying material in the container to the dispensing head.

In accordance with yet another aspect of the invention, a dispensing head for dispensing material from a container is provided which comprises a dispensing head conduit, fiducial marks adjacent to the dispensing head conduit for indicating the quantity of material present in the container, and a material supply conduit for conveying material in the container to the dispensing head conduit.

In accordance with another aspect of the invention, a level responsive indicator for indicating the level of material in a container is provided and comprises a level responsive device responsive to the level of material in the container, a movable indicator pivotally supported by the level responsive device, a material supply conduit for conveying material in the container to the dispensing head conduit, and a pivotal connection for pivotally connecting the level responsive device to the material supply conduit.

In accordance with a preferred embodiment of the invention, there is provided herein a combined dispensing head and gauge for indicating the quantity of material in a container. The dispensing head comprises a dispensing head conduit, fiducial marks adjacent to the dispensing head conduit for indicating the quantity of material present in the container, a movable pointer receiving chamber, and a sealing flange for sealing the dispensing head with respect to the container. The preferred combined dispensing head and level gauge further comprises a level responsive device responsive to the level of material in the container and a movable indicator having a pointer which is received in the receiving chamber adjacent to the fiducial marks for indicating the quantity of material present in the container. In the preferred embodiment, the movable indicator is controlled by the level responsive device, and the movable indicator is pivotally supported by the level responsive device. Preferably, a material supply conduit is connected to the dispensing head conduit for conveying material in the container to the dispensing head conduit; and preferably, the level responsive device is pivotally connected to the material supply conduit.

In accordance with the yet further teachings of the present invention, there is herein illustrated and described, a preferred embodiment thereof comprising a device adapted to dispense material from a container and to indicate the level of material in the container. This device includes a dispensing head, and further includes means for securing the dispensing head in sealing engagement with the container. The dispensing head has a conduit formed therein, and a tube carried by the dispensing head depends therefrom into the container and is in communication with the conduit. A nozzle is carried by the dispensing head, and the dispensing head further has a chamber formed therein. A float is supported by the tube, and a member is carried by the float. The member extends upwardly therefrom and has an end portion received within the chamber in the dispensing head. Indicating means are associated with the end portion of the member in the chamber for indicating the level of material in the container.

Preferably, the dispensing head is integrally molded from a plastic material which is at least semitransparent, and the indicating means includes graduations molded on the dispensing head about the member therein. The end portion of the member preferably comprises a pointer received in the chamber and cooperating with the graduations formed on the dispensing head outwardly of the chamber. The chamber is formed in the dispensing head rearwardly of the conduit therein, is substantially parallel thereto, and is separated by a wall therebetween. The means for securing the dispensing head in sealing engagement with the container preferably includes a disc carried by the dispensing head. The container has a top lip portion for supporting the disc; and a cap surrounds the dispensing head, is removably secured to the container, and presses the disc down against the top lip portion of the container to provide a seal. The container has a neck portion beneath its top lip portion; this neck portion is provided with external threads, and the cap has a lower skirt portion provided with internal threads for engaging the external threads on the neck portion of the container. The tube has an intermediate portion provided with a bracket extending laterally therefrom, and the float is pivotably mounted on the bracket about a transverse axis. Preferably, the member comprises a strap pivotably mounted on the float about a transverse axis laterally outwardly of the pivotable mounting of the float on the bracket on the tube, and the strap has an offset portion between the bracket on the tube and the dispensing head.

Additionally, the device is not affected by alcohol in the fuel. Some fuels have an alcohol content of approximately thirty percent (30%). Such an alcohol concentration would have a deleterious effect on the metal parts employed in prior art devices. The plastic material employed herein is an amorphous nylon with a filler. Moreover, being clear, the fuel flow through the device may be readily observed.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

FIG. 1 is a side elevation of the combined dispensing head and level gauge of the present invention, shown in association with a container in cross section, and with the broken lines indicating the alternate positions of the float and indicator for "E", "½", and "F", respectively.

FIG. 2 is a detailed cross sectional view thereof, taken across the lines 2—2 of FIG. 1.

FIG. 3 is a perspective view of the combined dispensing head and level gauge of the present invention.

FIG. 4 is a further perspective view of the bottom portion thereof, turned substantially ninety degrees from the showing in FIG. 3.

DETAILED DESCRIPTION OF THE PREFERRED EMBODIMENT

Figure 5:
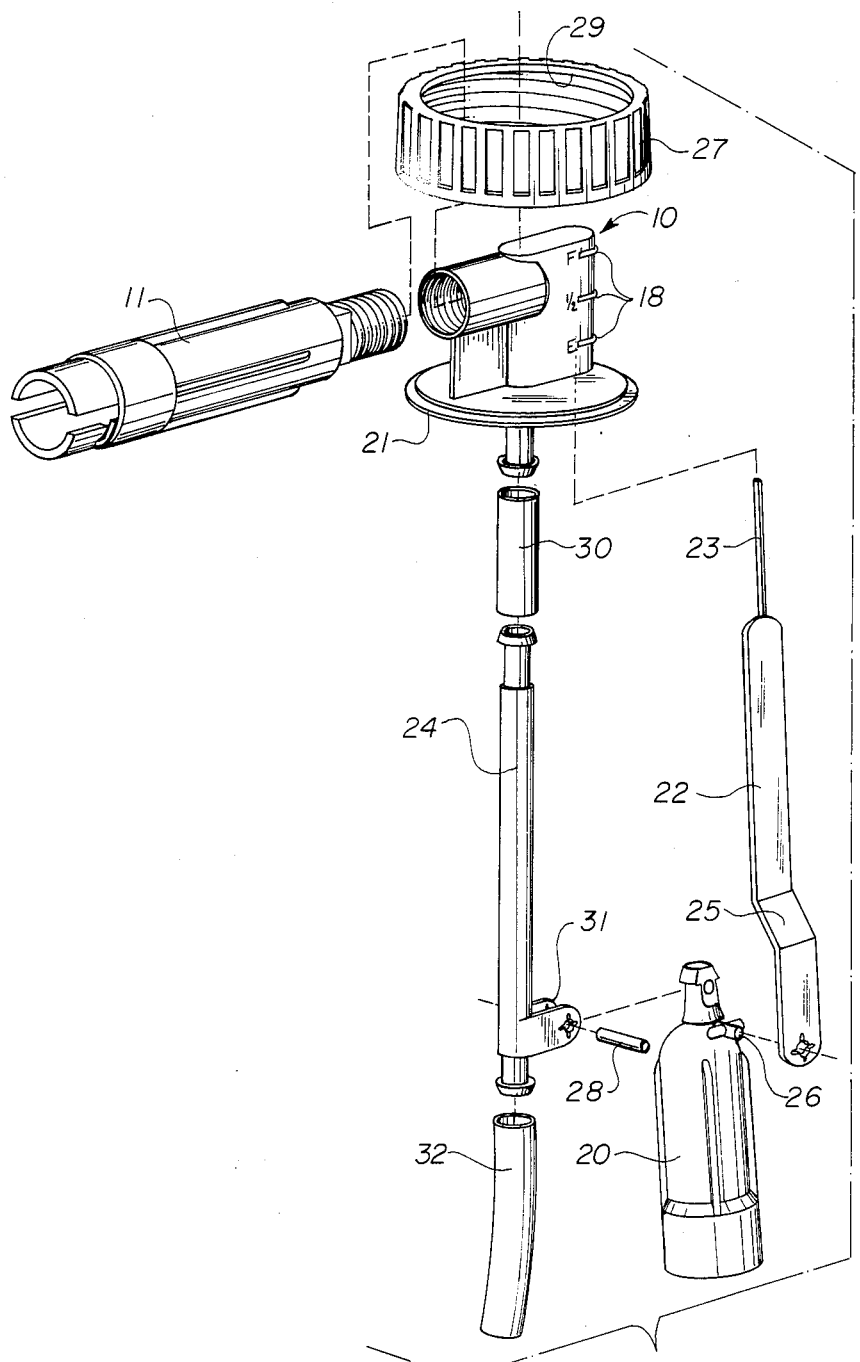
FIG. 5 is an exploded perspective view thereof.

With reference to the drawings, an improved dispensing head 10 is provided for dispensing material 12 from a container 14 and for indicating the level of material 12 in the container 14 that has not been dispensed. The dispensing head 10 comprises a dispensing head conduit 16 and fiducial marks (or graduations) 18 adjacent to the dispensing head conduit 16 for instantaneously indicating the quantity of material 12 present in the container 14. The dispensing head 10 is shown in association with a nozzle 11 which may be threaded and screwed into a complementarily threaded portion (not showns) of the dispensing head 10.

Preferably, the dispensing head 10 also includes a movable indicator receiving chamber 17 adjacent to the dispensing head conduit 16. Also, preferably, the dispensing head 10 includes a sealing flange 21 for sealing the dispensing head 10 with respect to the container 14.

A cap 27 is shown with its top portion located above the sealing flange 21. The sealing flange 21 rests on the top lip 29 of the container 14. Suitable external threads may be provided to engage complementary internal threads formed within the cap 27. When the cap 27 is screwed onto the container 14, the sealing flange 21 forms a seal with the top lip 29 of the container. If desired, additional sealing means such as resilient "0" rings (not shown) may be employed to provide an effective seal.

Preferably, the dispensing head 10 is of one-piece molded plastic construction.

The combined dispensing head and gauge of the present invention further includes a level responsive device or float 20 which is responsive to the level of material 12 in the container 14, to actuate a movable indicator. The movable indicator comprises a strap 22 (or other suitable member) having a pointer portion 23 disposed adjacent to the fiducial marks 18, thereby indicating the quantity of material 12 present in the container 14. Strap 22 is controlled by the float 20 and is supported thereon by a first pivotal connection 26. The float 20 is supported by a second pivotal connection 28 to U-shaped bracket 31 on a material supply conduit or tube 24 for conveying material 12 in the container 14 to the dispensing head.

The indicator receiving chamber 17 in the dispensing head 10 is separated from the dispensing head conduit 16 by an intervening wall 19, as shown more clearly in FIG. 2. The receiving chamber 17 is wide enough to receive pointer 23 of movable indicator 22 in all of its pointing positions from "E" to "F" (signifying "empty" and "full", respectively) as shown more clearly in FIGS. 6–8. The walls of the indicator receiving chamber 17 may be made from a transparent or semitransparent material to allow visual observation of the location of pointer 23, or the walls of chamber 17 may be opaque and have a slot or opening permitting observation of the pointer 23 which is received within the chamber 17.

The upper end of the material supply conduit 24 is connected to the dispensing head 10 by a first coupling tube 30. Furthermore, the lower end of the material supply conduit 24 is extended by a second tube 32 to the bottom 34 of the container 14. Alternatively, the material supply conduit 24 may be made of a one-piece construction in combination with the dispensing head 10.

Figure 6:
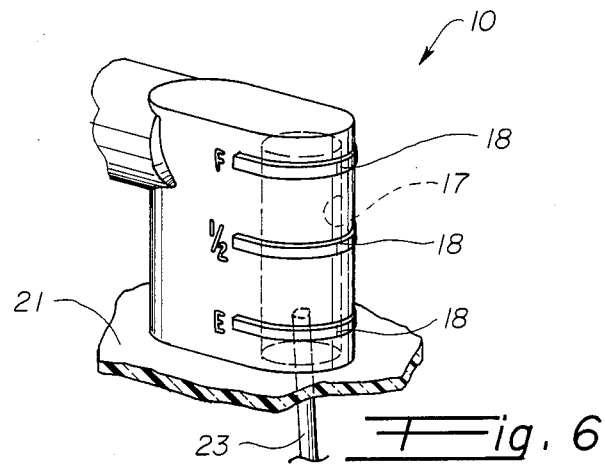
FIG. 6 is an enlarged portion of FIG. 1, with parts broken away and sectioned, and showing the position of the pointer when the container is empty.
Figure 7:
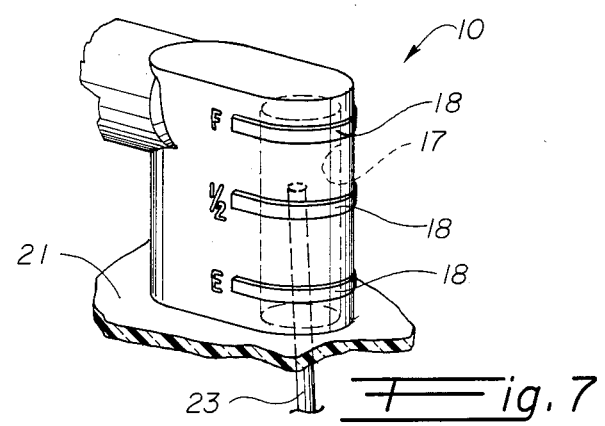
FIG. 7 corresponds substantially to FIG. 6, but shows the position of the pointer when the container is half full.
Figure 8:
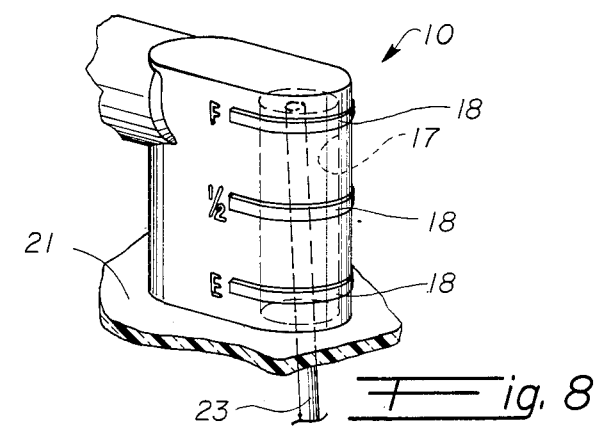
FIG. 8 corresponds to FIG. 6, but shows the position of the pointer when the container is full.

The combined dispensing head and gauge of the present invention indicates the quantity of material 12 in the container 14. As shown in FIGS. 1 and 6, when the float 20 is in its lowermost position, the container 14 is empty, and the movable indicator 22 is even with the fiducial mark "E". When the float 20 is at an intermediate position, as shown in FIGS. 1 and 7, the container 14 is substantially one-half full, and the movable indicator is even with the fiducial mark "½" as shown in FIG. 7. When the float 20 is in its uppermost position 40, the container 14 is substantially full, and the movable indicator 22 is even with the fiducial mark "F" as shown in FIG. 8.

Referring to FIG. 3, the bottom portion of the strap 22 is provided with an "S" shaped offset portion 25. The offset 25 is provided because the bottom of strap 22 is attached to the side of the float 20, whereas the pointer 23 of strap 22 moves in a path which is in a plane offset from the side of the float 20. More specifically, the pointer receiving chamber 17 is in a plane that is offset from the side of the float 20 at which the pivotal connection 26 is located. Another reason for providing the "S" shaped offset 25 in the strap 22 is to prevent the strap 22 from interfering with the vertical travel of float 20 when it is floated in the container 14 when the container is full ("F" position).

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A combined dispensing head and gauge for indicating the quantity of material in a container, comprising a dispensing head conduit means fiducial mark means adjacent to said dispensing head conduit means for indicating the quantity of material present in the container, a float having a length, said float being responsive to the level of material in the container, movable indicator means adjacent to said fiducial mark means for indicating the quantity of material present in the container, said indicator means controlled by said float, said moveable indicator means pivotally supported by said float, a material supply conduit having a length including an intermediate portion, the length of said material supply conduit being at least twice the length of the float, said material supply conduit being connected to said dispensing head conduit means, for conveying material in the container to said dispensing head conduit means, and means for pivotally connecting said float to the intermediate portion of said material supply conduit.

2. A combined dispensing head and gauge as described in claim 1, wherein said movable indicator means comprises an upper pointer portion and a lower portion for pivotally connecting to said float.

3. A combined dispensing head and gauge as described in claim 2, wherein the float and the upper pointer portion are positioned for movement in the same vertical plane, wherein the lower portion for the movable indicator means is pivotally connected to the float outside the said vertical plane, and wherein said movable indicator means includes an offset portion positioned between the pointer portion and said lower portion, said offset portion being oriented extending from the lower portion of the movable indicator means positioned for pivotal movement outside of the vertical plane to the upper pinter portion positioned for movement within the vertical plane for offsetting said pointer portion from said lower portion connected to said float, such that the float and the upper pointer portion each pivotally moves in substantially the same vertical plane.

4. A device adapted to disperse material from a container and to indicate the level of the material in the container, wherein the container has an opening provided with threads, said device comprising a dispensing head molded from a substantially transparent plastic material and including an integral bottom portion formed as a disc and providing a sealing flange, the dispensing head further including a conduit and a chamber substantially adjacent to the conduit, a nozzle removably secured to the dispensing head and in communication with the conduit therein, a cap surrounding the dispensing head and having threads cooperating with the threads on the opening in the container, thereby securing the dispensing head to the container, and thereby maintaining the flange in sealing engagement with the container, a tube having a length including an intermediate portion, said tube being carried by the dispensing head and communicating with the conduit therein and depending therefrom into the container, a float having a length, said float being pivotably mounted on the intermediate portion of the tube about a substantially transverse axis for pivotal movement in a vertical plane, the length of the tube being at least twice the length of the float, a member having a pair of ends, one of the ends being pivotably mounted on the float outside the vertical plane about a substantially transverse axis axis and laterally of the pivotable mounting between the float and the tube for pivotal movement outside said vertical plane, the other end of the member positioned for movement in substantially the same vertical plane as the float, the other end of the member carrying a pointer thereon, the pointer extending upwardly within the chamber in the dispensing head, the member further having an offset portion positioned between the pair of ends, said offset portion oriented extending from the one end positioned outside the vertical plane to the other end positioned within the vertical plane for offsetting the other end of the member having the pointer thereon from the end of the member connected to the float, such that the float and the other end of the member having the pointer thereon move in substantially the same vertical plane, and graduations on the dispensing head outwardly of chamber therein for cooperating with the pointer for indicating the level of liquid within the container.

5. The device of claim 4, wherein the nozzle is removably carried by the dispensing head forwardly thereof, and wherein the chamber is disposed in the dispensing head rearwardly of the conduit.

6. A device adapted tro dispense material from a container and to indicate the level of material in the container, said device comprising a dispensing head integrally molded from a plastic material, a disc carried by the dispensing head, the container having a top lip portion for supporting the disc, the container further having a neck portion between its top lip portion, the neck portion being provided with external threads, a cap surrounding the dispensing portion, said cap having a lower skirt portion provided with internal threads for engaging the external threads on the neck portion of the container, thereby removably securing the dispensing head to the container, and thereby pressing the disc down against the top lip portion of the container to provide a seal, a nozzle carried by the dispensing head, the dispensing head having a conduit formed therein, a tube carried by the dispensing head and depending therefrom into the container, the tube having a length including an intermediate portion provided with a bracket extending laterally therefrom, a float having a length, said float being pivotably mounted on the intermediate portion of the tube by the bracket about a transverse axis for pivotal movement in a vertical plane, the length of the tube being at least twice the length of the float, a strap having an upper end portion and a lower end portion, said lower end portion being pivotably mounted on the float about a transverse axis laterally outwardly of the pivotable mounting of the float on the bracket on the tube for pivotal movement outside said vertical plane, the upper end portion positioned for movement in substantially the same vertical plane as the float, the strap having an offset portion positioned between the upper and lower end portions, said offset portion oriented extending from the lower end portion positioned outside the vertical plane to the upper end portion positioned within the vertical plane for offsetting the upper end of the strap from the lower end of the strap, such that the float and the upper end portion of the strap move in substantially the same vertical plane, the dispensing head further having a chamber formed therein, the chamber being substantially vertically oriented and parallel to the conduit, a wall separating the chamber from the conduit in the dispensing head, the strap further having the upper end portion providing a pointer received in the chamber, and graduations formed on the dispensing head outwardly of the chamber and cooperating with the pointer to indicate the level of material in the container.

* * * * *